United States Patent
Köchl (10) Patent No.: US 12,551,977 B2
(45) Date of Patent: Feb. 17, 2026

(54) HANDLING SYSTEM AND HANDLING DEVICE FOR HANDLING WORKPIECE PALLETS

(71) Applicant: DECKEL MAHO Pfronten GmbH, Pfronten (DE)

(72) Inventor: Roland Köchl, Pfronten (DE)

(73) Assignee: DECKEL MAHO Pfronten GmbH, Pfronten (DE)

(*) Notice: Subject to any disclaimer, the term of this patent is extended or adjusted under 35 U.S.C. 154(b) by 316 days.

(21) Appl. No.: 18/253,786

(22) PCT Filed: Nov. 30, 2021

(86) PCT No.: PCT/EP2021/083587
§ 371 (c)(1),
(2) Date: May 21, 2023

(87) PCT Pub. No.: WO2022/128451
PCT Pub. Date: Jun. 23, 2022

(65) Prior Publication Data
US 2024/0001500 A1    Jan. 4, 2024

(30) Foreign Application Priority Data
Dec. 15, 2020  (DE) .................. 10 2020 133 542.3

(51) Int. Cl.
B23Q 7/14 (2006.01)
B23Q 1/66 (2006.01)

(52) U.S. Cl.
CPC ............. B23Q 7/1431 (2013.01); B23Q 1/66 (2013.01); B23Q 7/1442 (2013.01)

(58) Field of Classification Search
None
See application file for complete search history.

(56) References Cited

U.S. PATENT DOCUMENTS 4,480,738 A * 11/1984 Mattson ............... B23Q 7/1431
198/465.1
4,781,512 A * 11/1988 Ohta .................... B23Q 7/1431
414/280

(Continued)

FOREIGN PATENT DOCUMENTS

DE         3543579 A1 *  7/1986
DE    102008005957 A1 *  7/2009   ........... B23Q 7/1431

(Continued)

OTHER PUBLICATIONS

English language translation of Office Action dated Nov. 5, 2021 for DE App. Ser. No. 10 2020 133 542.3.

(Continued)

*Primary Examiner* — Gene O Crawford
*Assistant Examiner* — Muhammad Awais
(74) *Attorney, Agent, or Firm* — Henricks Slavin LLP (57) ABSTRACT

The invention relates to a handling system (1000) comprising a handling device (100) that has a carrier device (20) and a handling means (30) which is carried by the carrier device (20), intended for handling workpiece pallets (101, 101a, 101b), and comprises an exchange device (40) having at least two receiving spaces (41a, 41b) designed for receiving workpiece pallets (101, 101a; 101b), and the handling means (30) being designed to move the exchange device (40) relative to the carrier device (20) in a first movement direction X in such a way that both receiving spaces (41a, 41b) are moved together, characterized in that the handling means (30) is also designed to decouple a workpiece pallet (101a, 101b) which is handled by the handling means (30) and received in one of the at least two receiving spaces (41a, 41b) from the exchange device (40) via at least one decoupling device (42a, 42b) in such a way that the decoupled workpiece pallet (101a; 101b) substantially retains its posi- (Continued)

tion relative to the carrier device (20) during a movement of the exchange device (40) in the first movement direction X.

14 Claims, 4 Drawing Sheets

(56) References Cited

U.S. PATENT DOCUMENTS

| | | | | |
|---|---|---|---|---|
| 7,357,769 B2 * | 4/2008 | Takayama | ............ | B23Q 1/5406 |
| | | | | 483/41 |
| 2006/0270540 A1 * | 11/2006 | Takayama | ............ | B23Q 1/5406 |
| | | | | 409/137 |
| 2007/0289115 A1 * | 12/2007 | Kawai | ................. | B23Q 1/4852 |
| | | | | 29/33 P |
| 2015/0034453 A1 * | 2/2015 | Busch | ....................... | B23Q 5/22 |
| | | | | 198/346.1 |
| 2015/0298272 A1 * | 10/2015 | Murata | .............. | B23Q 11/0891 |
| | | | | 414/222.07 |

FOREIGN PATENT DOCUMENTS

| | | | | |
|---|---|---|---|---|
| DE | 102015206914 A1 | | 10/2015 | |
| JP | 05-63742 | | 8/1993 | |
| JP | 10156657 A | * | 6/1998 | |
| JP | 2000271830 A | * | 10/2000 | |
| JP | 2007038348 A | * | 2/2007 | |
| JP | 2007-319951 A | | 12/2007 | |
| WO | WO-2009144831 A1 | * | 12/2009 | ........... B23Q 7/1431 |
| WO | WO-2020043916 A2 | * | 3/2020 | ........... B23Q 37/007 |
| WO | WO-2020221470 A1 | * | 11/2020 | ................ B66F 9/18 |

OTHER PUBLICATIONS

International Search Report dated Feb. 23, 2022 for PCT App. Ser. No. PCT/EP2021/083587.
Office Action dated Sep. 3, 2024 for JP App. Ser. No. 2023-527712 with English language translation.
Office Action dated Jan. 7, 2025 for JP App. Ser. No. 2023-527712 with English language translation.
Office Action dated Sep. 27, 2025 for CN App. Ser. No. 202180084991.4 with English summary.

* cited by examiner

HANDLING SYSTEM AND HANDLING DEVICE FOR HANDLING WORKPIECE PALLETS

TECHNICAL FIELD

The present invention relates to a handling system including a handling device for handling workpiece pallets, a handling device for use with the handling system, and a machine tool including a handling system.

BACKGROUND OF THE INVENTION

Handling systems for handling workpiece-carrying workpiece pallets for use in partially or fully automated production processes are known from the prior art. For this purpose, it is always desirable to provide handling systems which, on the one hand, can handle workpiece pallets in the most versatile and efficient manner possible and, on the other hand, are characterized by a relatively compact design.

The possible areas of application of such handling systems include handling workpiece pallets on a machine tool, in particular in the course of a pallet change being performed in a work space of the machine tool, or handling in connection with a pallet storage or a setup station.

A problem with known handling systems is that usually only one workpiece pallet is moved by a handling device of the handling system, so that, for example, a pallet change in the work space of the machine tool requires a combination of a plurality of movements, in the course of which a workpiece pallet to be removed is first picked up by a receiving device in the work space and is transferred to a storage location before a new workpiece pallet to be inserted can be picked up from another storage location and transferred to the receiving device in the work space.

Other handling systems from the prior art rely on the essentially simultaneous handling of two workpiece pallets in order to counteract the problems described above and, inter alia, to reduce the number of movements required.

However, the higher the number of workpiece pallets handled simultaneously, the more disadvantageous this is for the handling device itself, since said handling device is subject to additional load that must be taken into account when configuring and using the handling system.

SUMMARY OF THE INVENTION

Therefore, an object of the present invention is to provide a handling system with improved simultaneous handling of a plurality of workpiece pallets.

To achieve this object, a handling system including a handling device according to claim 1 and a handling device for use in a handling system according to claim 13 is proposed.

A further object of the present invention is also to provide a machine tool with an improved possibility for changing workpiece pallets in a work space of the machine tool.

To achieve this object, a machine tool including a handling system according to claim 14 is proposed.

The respective dependent claims relate to preferred embodiments of the handling system according to the invention, the handling device according to the invention and the machine tool according to the invention, which may each be provided individually or in combination.

According to a first aspect of the invention, a handling system for handling workpiece pallets is provided, which comprises a handling device. The handling device comprises a carrier device and a handling means for handling workpiece pallets, which is carried by the carrier device and includes an exchange device with at least two receiving spaces configured to receive workpiece pallets. The handling means is further configured to move the exchange device relative to the carrier device along a first direction of movement in such a way that both receiving spaces are moved together. The handling system is characterized in that the handling means is additionally configured to use at least one decoupling device to decouple a workpiece pallet handled by the handling means and received in one of the at least two receiving spaces from the exchange device in such a way that the decoupled workpiece pallet substantially maintains its position relative to the carrier device during a movement of the exchange device along the first direction of movement.

Workpiece pallets are to be understood as pallets configured to carry workpieces, which can be used in a large number of receiving devices which usually have standardized receiving interfaces.

The movement of the exchange device along the first direction of movement is to be understood as both forward and backward movement. In other words, the exchange device may be moved back and forth along the first direction of movement.

"Substantially" maintaining the position of the decoupled workpiece pallet relative to the carrier device means a numerical position of the decoupled workpiece pallet with respect to the carrier device does not have to remain constant over an entire movement of the exchange device, but it may move within typical deformation and storage limits. For example, during the movement of the exchange device, changes in said position information caused by elastic component deformations of the handling device or by floating mounting of the decoupled workpiece pallet should be permissible as long as these do not conflict with the aim of moving the exchange device in the course of a traversing movement relative to the carrier device, without moving the decoupled workpiece pallet to a degree similar to the magnitude of the traversing movement.

The handling system according to the invention including the handling device can advantageously be used to handle at least two workpiece pallets essentially simultaneously by means of the handling system, in particular by means of the handling means of the handling device. In this way, the number of movements required in the course of any handling process can be significantly reduced since, for example, a first workpiece pallet does not have to be deposited first before a second workpiece pallet can be handled by the handling means.

Furthermore, the second of the at least two receiving spaces may also be used as an additional storage space for workpiece pallets, which means that the maximum number of workpiece pallets in the handling system can be increased by at least one. For example, in the case of a pallet store associated with the handling system, the number of workpiece pallets that can be stored or placed in the handling system can be increased by one without having to make the pallet store itself larger.

The possibility of additionally receiving a plurality of workpiece pallets inevitably results in an increased load on the entire handling device since the weight of a single workpiece pallet to be handled may usually be up to 1.5 tons or more. The additional weight of further workpiece pallets causes not only an additional static load on the handling device, but also an additional dynamic load during traversing movements, which is advantageously counteracted by the configuration according to the invention with a decoupling device, as explained in detail below.

In an initial state of the exchange device, the receiving spaces are preferably arranged in relation to the rest of the handling device in such a way that the workpiece pallets received in the receiving spaces are arranged as symmetrically as possible, in particular in relation to the load-bearing carrier device. In other words, when the handling device is in an initial state, the receiving spaces are preferably arranged symmetrically in relation to the carrier device.

In this way, a resulting tilting moment caused by the weight of the workpiece pallets and acting on the handling means and thus also on the carrier device can be greatly reduced in the initial state since the respective individual tilting moments of the workpiece pallets in the symmetrically arranged receiving spaces almost compensate each other.

In the course of a movement of the exchange device from the initial state to an extended state, a redistribution of the carried mass inevitably takes place since the exchange device also moves the workpiece pallets received in the receiving spaces into a state of asymmetrical arrangement. Among other things, this results in a considerable increase in the resulting tilting moment since the movement paths of the exchange device usually have to cover pretty large distances, resulting in a relatively long lever arm between the carrier device carrying the handling means and the extended receiving spaces of the exchange device. Coupled with the usually large mass of the workpiece pallets, the resulting tilting moment represents a quantity that is particularly relevant to the configuration.

The additional load acting on the handling means and thus also on the carrier device in the extended state leads both to increased material loads (in the sense of material stresses) and to increased deformations of components of the handling device, in particular in the form of bending and/or torsion. This may not only be disadvantageous for the service life of the entire handling device, but also have a negative effect on the precise handling of the workpiece pallets, in particular when the handling device interacts with other receiving devices for workpiece pallets.

The decoupling device according to the invention allows at least one workpiece pallet to be kinematically decoupled from the exchange device before a movement so that movements of the exchange device along the first direction of movement are not transferred to the decoupled workpiece pallet. Although the handling device continues to carry the workpiece pallet decoupled from the exchange device, the exchange device itself is relieved in such a way that it neither has to carry nor move the mass of the decoupled workpiece pallet. In the course of a movement of the exchange device along the first direction of movement, e.g. from the initial state to an extended state, the decoupled workpiece pallet remains substantially in place in relation to the carrier device.

Hence, in the course of a displacement movement of the exchange device, less of the mass causing the tilting moment is moved, as a result of which the previously described effect of increasing the resulting tilting moment can be significantly reduced. In addition, the decoupled workpiece pallet may advantageously function as a counterweight to the other workpiece pallets moved by the exchange device in order to additionally reduce the resulting tilting moment.

In this way, the resulting tilting moment in the extended state can be significantly reduced compared to a common movement of all workpiece pallets, which in turn has a positive effect on the loading and deformation of the individual components of the handling device, so that, for example, the exchange device or the carrier device can be embodied in a manner that saves more material.

Furthermore, a dynamic load on the handling device is advantageously reduced since the reduction in the mass to be moved also results in inertia effects being significantly lower (in the case of two receiving spaces, these are almost halved even), so that, for example, a lower drive power of a drive device of the exchange device is required or shorter travel times with more pronounced acceleration and/or braking processes can be implemented. In other words, a reduction in the mass to be moved enables faster and more precise movement-based handling of the workpiece pallets.

The handling device of the handling system according to the invention thus offers the possibility of handling a plurality of workpiece pallets essentially simultaneously while keeping the associated additional load as low as possible in order to not only reduce the number of necessary traversing movements, but also to ensure fast and precise handling of the workpiece pallets. In other words, an overall mechanical load on the handling device can be significantly reduced without having to forego the possibility of essentially simultaneously handling a plurality of workpiece pallets.

The term "essentially simultaneous handling" does not mean that the workpiece pallets always have to be moved simultaneously. Rather, it is to be understood as the fundamental possibility of being able to move the plurality of workpiece pallets received and handled by the handling means in the course of traversing movements of the handling means and the exchange device, partially together or in quick succession.

The decoupling device is of course also configured to recouple the decoupled workpiece pallet so that they can again be moved by the exchange device along the first direction of movement.

Preferably, the first direction of movement of the exchange device is in a horizontal direction, parallel to a floor surface.

As a result, the workpiece pallets to be moved by the exchange device along the first direction of movement are always moved perpendicularly (or at least almost perpendicularly) to the Earth's gravitational field so that a drive device of the exchange device does not have to work directly against the weight force acting in the vertical direction.

The directions "vertical" and "horizontal" are always to be understood as relational directions relative to a floor surface on which the handling system according to the invention is arranged, with "horizontal" essentially designating a parallel orientation and "vertical" designating a perpendicular orientation relative to the floor surface. The vertical direction usually extends in parallel to the direction of the Earth's gravitational field.

The handling device preferably comprises a first drive unit, by which the exchange device is driven in order to move it along the first direction of movement. The drive device preferably comprises a chain drive which allows for a space-saving transmission of drive forces and/or drive moments.

In a preferred embodiment, the handling device is configured to transfer a workpiece pallet received in one of the at least two receiving spaces to at least one target device configured to receive workpiece pallets and/or to receive a workpiece pallet received from the at least one target device in one of the at least two receiving spaces.

This creates an interaction possibility of the handling device with other devices or target devices, in the course of which workpiece pallets can be moved or exchanged between them. In this way, the handling system enables a comprehensive and, above all, automated handling of workpiece pallets, which can be moved and also exchanged between the handling device and one or more target devices. In this way, necessary exchanging processes of workpiece pallets can be optimized within the framework of fully and/or partially automated production in order to reduce both production times and production costs.

Here, the target devices are always configured to receive and carry workpiece pallets. Preferably, the target devices comprise receiving means for positioning means, which are arranged on the workpiece pallets and with which the workpiece pallet can be uniquely positioned with respect to a target device in a predetermined manner, thereby improving subsequent interaction of any further device, which usually depends heavily on correct and unique positioning of the workpiece pallet. Alternatively, the target devices may also comprise the positioning means and the workpiece pallets may comprise the associated receiving means.

Preferably, the at least one target device is (but is not limited to) one of a group of target devices comprising
- a receiving device of a machine tool,
- a receiving device of a setup station,
- a holding device of a transport device for transporting workpiece pallets,
- a storage and/or depositing space for temporary storage of workpiece pallets.

The handling device is preferably configured to interact with each of the target devices mentioned in the group of target devices in the manner described (receiving and/or transferring workpiece pallets).

In a particularly preferred embodiment, the at least one target device is a receiving device arranged in a work space of a machine tool set up adjacent to the handling system.

As a result, a workpiece pallet handled by the handling device may, among other things, be brought directly into the work space of the machine tool in a position suitable for subsequent workpiece machining and may also be removed directly from the work space again after the workpiece has been machined by the machine tool. In this way, processes for exchanging workpiece pallets in the course of automated machining of the workpieces clamped thereon can be significantly shortened.

The handling system is preferably configured as part of the machine tool. As a result, the machine tool or the work space of the machine tool and the handling device of the handling system may be tuned to one another from the outset, so that, for example, the installation space occupied in a production hall can be reduced or a sealing of the work space at an interface between the work space and the handling device can be optimized.

Alternatively, the handling system may also be provided as an add-on solution to existing or installed machine tools so that the options offered by the handling system according to the invention for handling workpiece pallets can be added to them without any problems.

The use of the handling system according to the invention is in no way limited to use on a machine tool, but it may be used, inter alia, in storage systems that may be set up, for example, in the production hall or in a separate storage hall. For example, in such a case, the handling system may advantageously improve (basically accelerate) automated loading (and/or removal) of transport devices that are configured, among other things, for transporting workpiece pallets to and from machine tools and/or machining centers, thereby making it possible to save time and associated costs.

In a particularly preferred embodiment, the at least one decoupling device comprises a lifting device configured to decouple a workpiece pallet received in a receiving space associated with the at least one decoupling device from the exchange device by means of a vertically directed lifting movement.

The associated receiving space of the decoupling device is to be understood as that receiving space of the exchange device that has a workpiece pallet received therein that can be decoupled from the exchange device by the decoupling device in a specified state of the exchange device. In particular, this specified state of the exchange device is the initial state of the exchange device.

Lifting the workpiece pallet through the lifting movement is an efficient way to achieve kinematic decoupling from the exchange device, e.g. with the help of translationally movable actuators (linear actuators). In this way, the kinematics required for decoupling can be kept simple and inexpensive with the aid of the lifting device.

Of course, the lifting device is also configured to couple the decoupled workpiece pallet back into the exchange device by means of a lowering movement that is opposite to the lifting movement so that movements of the exchange device can be transmitted again.

The exchange device preferably includes a plurality of support portions, on which the workpiece pallet respectively received is supported, at each of the at least two receiving spaces. Furthermore, the exchange device may additionally include delimiting portions configured to limit a movement of a respective workpiece pallet resting on the support portions relative to the support portions. This reliably prevents the workpiece pallet from slipping down in the course of a movement of the exchange device and/or the handling means itself by positive locking. The support portions are usually arranged horizontally and the delimiting portions are arranged at an angle to the support portions—in particular perpendicularly.

The lifting movement of the lifting device lifts the workpiece pallet from the support portions so that a movement of the exchange device along the first direction of movement can no longer be transferred to the lifted and thus decoupled workpiece pallet.

Preferably, the lifting device of the at least one decoupling device comprises a plurality of lifting elements, in particular five, which are arranged symmetrically with respect to the decoupling device and each comprise a drive device each configured to effect the lifting movement by means of a translatory movement.

As a result, the load to be decoupled can be distributed evenly over a plurality of drive devices. Furthermore, the symmetrical arrangement of the lifting elements reliably prevents the workpiece pallet from tilting during the lifting movement.

Preferably, a drive device of the lifting device of the at least one decoupling device, in particular a drive device of the individual lifting elements, is configured to be self-locking such that the position of the lifting device is maintained independently of an energy supply to the drive device of the lifting device.

As a result, no permanent power supply of the drive device of the decoupling device or the lifting device is necessary to hold the decoupled workpiece pallet in position. This not only reduces energy costs, but also prevents the lifting device from being lowered in the event of a possibly unintentional interruption in the energy supply.

In a particularly preferred embodiment, the at least one decoupling device comprises at least one receptacle for positioning means, which is configured to engage in a positioning means arranged on the underside of a workpiece pallet received in the associated receiving space in the course of the lifting movement in such a way that a position and orientation of the workpiece pallet, which is decoupled by the lifting movement, in relation to the at least one decoupling device is clearly defined.

The decoupling device preferably comprises one to six receptacles for positioning means, in particular four which are arranged symmetrically with respect to the decoupling device.

As a result, the position of the decoupled workpiece pallet or the center of gravity thereof on the handling means is clearly defined so that uneven loading of the handling device during the course of decoupling can be prevented or at least reduced.

Furthermore, in the course of recoupling the decoupled workpiece pallet, it may be deposited in a controlled manner in a fixed position in the receiving space. This not only avoids a deviation from a target position in the receiving space that may be caused by the decoupling, but the decoupling device may also be used in an advantageous manner to correct a position of a workpiece pallet that may have been incorrectly received (i.e. into a position that does not correspond to the target position) after a reception in one of the at least two receiving spaces.

In a particularly preferred embodiment, the handling means comprises a plurality of decoupling devices, with each receiving space of the exchange device being associated with one of the plurality of decoupling devices.

As a result, a workpiece pallet received in each receiving space of the exchange device can be decoupled separately from the exchange device in an advantageous manner. In this way, the above-mentioned advantages of using the decoupling device can be extended to each receiving space of the exchange device.

In a particularly preferred embodiment, the exchange device is configured as a horizontally extendable telescopic device comprising at least one telescopic carriage which can be moved horizontally in the first direction of movement relative to at least one telescopic rail of the telescopic device and on which the at least two receiving spaces are arranged.

For reasons of storage, the telescopic mechanism of the telescopic device is usually configured with two telescopic rails, i.e. a pair of telescopic rails, on which at least one telescopic carriage is mounted so as to be movable.

The telescopic device preferably comprises two pairs of telescopic rails and two telescopic carriages, with a first telescopic carriage being mounted in a first pair of telescopic rails so that it can be moved along the first direction of movement and a second telescopic carriage, on which the at least two receiving spaces are arranged, being mounted in a second pair of telescopic rails arranged on the first telescopic carriage so that it also can be moved along the first direction of movement. In other words, the telescopic device preferably comprises a double telescopic extension.

Configuring the exchange device as a telescopic device, in particular with a double telescopic extension, not only allows for relatively large distances in the first direction of movement to be covered when the exchange device is in an extended state, but also to realize a relatively rigid structure at the same time, thereby minimizing bending of the exchange device in the extended state.

Preferably, the rigidity of the exchange device may be additionally increased by configuring the cross-sectional geometries of the telescopic carriages perpendicular to an extension direction (corresponding to the first direction of movement) in such a way that the telescopic carriages have high bending and/or torsional rigidity.

In a particularly preferred embodiment, the handling device is configured to move the handling means in a translatory manner relative to the carrier device along a vertically oriented direction of movement by means of a translatory drive device.

As a result, the possibilities of movement of the handling device are expanded by an additional degree of freedom (up and down along the vertical direction of movement) so that more complex movement sequences can be implemented when handling the workpiece pallets.

Preferably, the translational drive device comprises a vertically aligned lead screw which is driven by means of a second drive unit.

In a particularly preferred embodiment, the carrier device is configured in the form of a frame with a base element, two side elements and a head element, with the two side elements each comprising at least two guide rails via which the handling device carried by the carrier device is mounted so that it can be moved along the vertically oriented direction of movement.

The frame-like structure of the carrier device requires a high bending and torsional rigidity of the carrier device and thus reduces load-related deformations, in particular in the case of a resulting tilting moment acting in the extended state. Due to the double support on both sides with the guide rails, an optimal support of the entire handling device including the exchange device is guaranteed, in particular in the extended state. In addition, a jamming of the handling device in the course of a traversing movement along the vertically oriented direction of movement can be prevented.

The handling means is at least partially arranged in a region partially enclosed by the frame-shaped carrier device. In particular, the handling means protrudes from a front and a rear boundary surface of the enclosed region. The first direction of movement extends in parallel to the base and/or head element through the front and rear boundary surfaces. In other words, the exchange device can be moved back and forth through an opening in the frame-shaped carrier device.

This overall structure enables an improved, in the initial state even symmetrical load application to the carrier device, which, in addition to the high rigidity of the structure, promotes precise placement of the workpiece pallets being handled.

In a particularly preferred embodiment, the handling device comprises a base device carrying the carrier device, wherein the handling device is configured to rotate the carrier device relative to the base device via a rotary drive device about a vertically oriented axis of rotation.

As a result, the possibilities of movement of the handling device are expanded by an additional degree of freedom so that more complex movement sequences can be implemented when handling the workpiece pallets, in particular with the help of a rotation of the entire carrier device including the handling means.

The handling device preferably comprises a third drive unit for driving the rotary drive device.

The handling device of the handling system preferably comprises an electronic control device which is coupled to the exchange device, the decoupling device and the rotary and/or translatory drive device present in the respective embodiment and is configured to control the coupled devices, in particular the first, second and or third drive units.

The control device is preferably configured to control the coupled exchange device, the coupled drive devices and the coupled decoupling device simultaneously.

As a result, in the course of handling, traversing movements of the handling device, in particular of a receiving space, from an initial position to a target position can be optimized in such a way that no sequential control of the individual drive devices is performed, but combined movement sequences are possible. For example, the exchange device may be returned to the initial state while the handling device is moved along the vertically oriented direction of movement. Or a workpiece pallet that has already been received can be decoupled while the carrier device is rotated in preparation for receiving another workpiece pallet. In this way, the movement distances and the movement times in the course of handling workpiece pallets can be significantly reduced.

In a particularly preferred embodiment, the handling device is configured to position one of the at least two receiving spaces by movements of the handling device along the vertically oriented direction of movement and/or by twisting movements about the vertically oriented axis of rotation and/or by movements of the exchange device along the first direction of movement in such a way relative to the at least one target device that a workpiece pallet received from the target device can be received by the exchange device in the positioned receiving space and/or a workpiece pallet received in the positioned receiving space can be transferred to the target device.

As a result, three degrees of freedom are available (2 translational+1 rotational degree of freedom) to align a received workpiece pallet or an empty receiving space with respect to a target device in three spatial directions. In principle, the movements may be performed both along the first direction of movement and along the vertical direction of movement back and forth or up and down, and clockwise or counterclockwise in the case of a twisting movement about the axis of rotation.

Preferably, the handling device is configured to deposit a workpiece pallet in one of the at least two receiving spaces by a movement along the vertically oriented direction of movement in a target device and/or to lift a workpiece pallet located in the target device by a movement along the vertically oriented direction of movement from the target device.

In a particularly preferred embodiment, the handling system comprises a pallet storage with a large number of storage spaces configured to receive workpiece pallets, each of the storage space being a target device for the handling device.

Due to the pallet storage, the handling system comprises a large number of storage spaces, in each of which a workpiece pallet can be deposited and temporarily stored before it is received again by the handling device or the handling means. For example, exchange processes on a machine tool can be optimized in this way since the machine tool can be loaded directly from one of the numerous storage spaces with temporarily stored workpiece pallets.

In a particularly preferred embodiment, the handling system comprises a docking device configured for docking a driverless transport vehicle with at least one holding device configured for receiving workpiece pallets, wherein the at least one holding device of the transport vehicle, when docked on the docking device, is a target device for the handling device.

The possibility of connecting a driverless transport vehicle to the handling system via the docking device may further expand the options for handling workpiece pallets. The handling system may advantageously be supplied with new workpiece pallets via one or more driverless transport vehicles, or workpiece pallets that are no longer required may be transported away from the handling system. As a result, the handling system can be expanded to include an interface for connection to a partially or fully automated transport network for transporting workpiece pallets in one or more production halls. This has proven itself useful, in particular in combination with the configuration of the handling device according to the invention, for fast, flexible and precise handling of workpiece pallets since docked transport devices can be loaded and/or unloaded more quickly, which makes it possible to shorten the docking times (time in the docked state) of the transport vehicles and to achieve a higher throughput rate of workpiece pallets in the overall transport network. For example, a workpiece pallet delivered by the driverless transport vehicle may be placed in an empty receiving space of the handling device or the exchange device, and immediately afterwards a workpiece pallet that is already in the exchange device and no longer required can be handed over to the transport vehicle for transport without one of the respective pallets having to be deposited in the meantime by the handling device.

The handling system preferably also comprises one or more driverless transport vehicles, each of which includes at least one holding device for workpiece pallets and is configured to dock with the docking device of the handling system in such a way that the at least one holding device acts as a target device for the handling system.

As a result, the handling system according to the invention advantageously comprises a transport network of one or more driverless transport vehicles with which even large spatial distances can be covered in the course of handling workpiece pallets, which also represents an improvement in terms of the simultaneous handling of a plurality of workpiece pallets that can be moved simultaneously by the transport vehicles and the handling device of the handling system.

The driverless transport vehicle is to be understood as a vehicle that moves independently and automatically, preferably along a virtual guidance network independently of a physical control or guiding device.

According to a further aspect of the invention, a handling device for use in a handling system according to a first aspect of the invention is provided.

According to a further aspect of the invention, a machine tool is provided, comprising a work space including at least one receiving device which is arranged therein and configured to receive workpiece pallets and a handling system according to a first aspect of the invention arranged adjacent to the work space, the at least one receiving device arranged in the work space being a target device of the handling system.

As a result, the machine tool or the work space of the machine tool and the handling system can be adapted to one another from the outset, in particular for a pallet exchange in the work space.

With the aid of the handling system, a pallet exchange can be performed within a very short time since unnecessary movements, e.g. prior deposition of the workpiece pallet removed from the work space, are avoided. For example, the handling device can receive the workpiece pallet from the work space in an empty receiving space of the exchange device and then directly insert a workpiece pallet received in another receiving space into the work space without having to deposit the removed workpiece pallet beforehand.

Furthermore, the handling system may be arranged within a housing of the machine tool so that the machine tool including the handling system is a single assembly closed to the outside. Thus, among other things, costs can be saved compared to a separate configuration of the machine tool and handling system, and the space required for installation in a production hall can be reduced.

Preferably, the access of the handling device of the handling system to the work space of the machine tool may be closed by a flap or door unit so that contamination occurring during machining in the work space does not get into the surroundings of the handling system, thereby avoiding damage to the handling system.

Further aspects and advantages thereof as well as more specific exemplary embodiments of the aspects and features mentioned above are described below using the drawings shown in the attached figures:

Identical or similar elements in the figures may be denoted by the same reference symbols, but sometimes also by different reference symbols.

It is pointed out that the present invention is in no way limited to the embodiments described below and implementation features thereof. The invention also includes modifications of the exemplary embodiments mentioned, in particular those resulting from modifications and/or combinations of one or more features of the exemplary embodiments described within the scope of the independent claims.

DETAILED DESCRIPTION OF THE FIGURES

Figure 1:
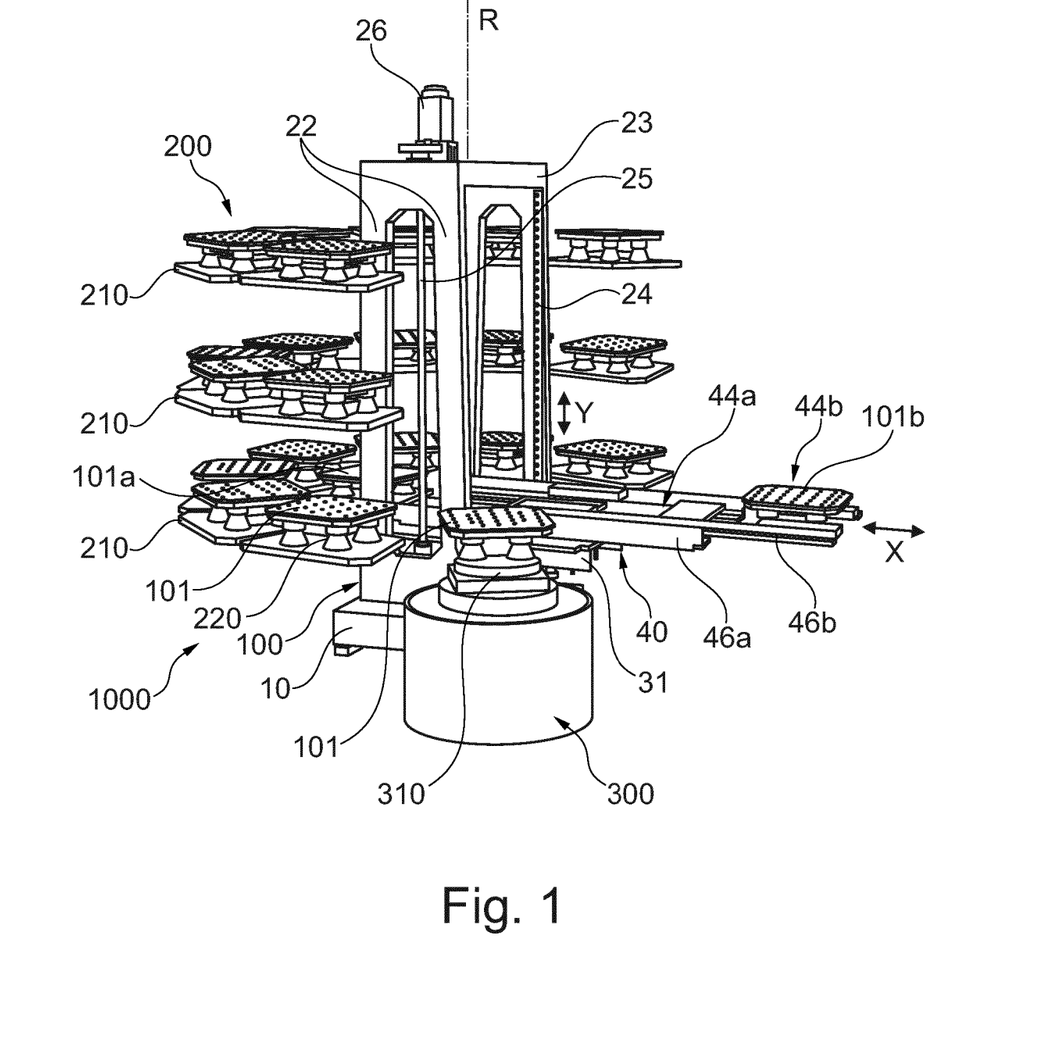
FIG. 1 shows an embodiment of the handling system including the handling device, the pallet storage and the setup station.

FIG. 1 shows an embodiment of the handling system 1000 including a handling device 100, a pallet storage 200 and a setup station 300.

The handling device 100 comprises a base 10, a frame-shaped carrier device 20 connected thereto and a handling means 30 carried by the carrier device for handling workpiece pallets 101, in particular first and second workpiece pallets 101a and 101b that are currently being handled in the illustrated state.

The base 10 is set up on a floor surface and may be connected thereto by suitable fastening means, not shown here, in order to increase the stability of the entire handling device 100.

The carrier device 20 is rotatably connected to the base 10 and can be rotated about a vertically oriented axis of rotation R relative to the base 10 by means of a rotary drive device, not shown here.

The carrier device 20 itself is configured to be frame-shaped, with side elements of the frame being formed by two separate side struts 22 each. The side struts 22 merge with a base element on the lower side of the carrier device 20 and with a head element 23 on the upper side.

The frame-shaped structure of the carrier device 20 configured in this way has a high degree of rigidity with regard to bending and torsion and is therefore particularly suitable for carrying the handling means 30 arranged within the frame.

A vertically extending guide rail 24 (one per side strut 22) is arranged on opposite sides of each of the four side struts 22, wherein the handling means 30 or a carrier element 31 of the handling means 30 is mounted thereon so as to be movable along a vertical movement direction Y (Y-direction). The guide rails 24 thus limit the possible relative movements of the carrier element 31 relative to the carrier device 20 to a vertical movement in the Y-direction and at the same time ensure an optimal load application of a load acting on the handling means 30 to the carrier device 20, in particular of a tilting moment caused by the weight of the workpiece pallets 101a, 101b being handled.

A movement of the handling means 30 is carried out via a translatory drive device with a vertical spindle 25 which is driven by means of a spindle drive 26 arranged on the upper side of the head element 25.

The handling means 30, which can be moved vertically along the Y-direction, comprises the carrier element 31, which is movably connected to the carrier device 20; an exchange device 40 arranged thereon with first and second receiving spaces 44a and 44b for workpiece pallets and decoupling devices, not shown in the illustration given, via which the workpiece pallets 101a, 101b handled by the handling means 30 can be decoupled from the exchange device 40.

The exchange device 40 can be moved, together with the two receiving spaces 44a, 44b, horizontally along a first direction of movement X (X-direction) relative to the carrier element 31 and thus also to the carrier device 20, wherein the state shown in FIG. 1 corresponds to an extended state in which the second workpiece pallet 101b received in the second receiving space 44b was moved in the X-direction in order to transfer it, for example, to a target device, not shown here, which is configured for receiving it.

It should be noted at this point that the chosen direction designations X and Y or X-direction and Y-direction are not restrictive but merely arbitrarily chosen designations that serve to better distinguish the individual directions.

An extension mechanism of the exchange device in the X-direction is based on a double telescopic extension, in which a first telescopic carriage 46a can be telescoped out relative to the carrier element 31 and a second telescopic carriage 46b can in turn be telescoped out relative to the first telescopic carriage 46a. The two receiving spaces 44a, 44b are arranged on the second telescopic carriage 46b.

In the extended state shown, the first workpiece pallet 101a has been decoupled from the exchange device 40 in advance, so that the first receiving space 44a is empty.

Before a movement of the exchange device 40 into the extended state shown, the first workpiece pallet 101a was decoupled from the exchange device 40 by the decoupling device associated with the first receiving space 44a so that the movement of the exchange device 40 to achieve the state shown was not transferred to the decoupled first workpiece pallet 101a so that it stayed in place.

FIG. 1 clearly shows that the decoupling of the first workpiece pallet 101a significantly reduces a load acting on the handling means 30 and thus on the complete handling device 100 in the extended state shown. Without the decoupling by the decoupling device, the currently empty first receiving space 44a would also be occupied by a workpiece pallet, namely the first workpiece pallet 101a, the weight of which would additionally burden the complete structure, particularly in view of such a long lever arm in the extended state which inevitably leads to a relatively high resultant tilting moment.

However, this is advantageously avoided by the configuration according to the invention with the decoupling devices.

In addition, the weight of the decoupled workpiece pallet 101a even acts as a counterweight to the exchange device 40 extended on the other side so that a tilting moment in the opposite direction leads to an additional reduction in the resulting tilting moment.

For handling workpiece pallets—receiving and/or transferring workpiece pallets from and/or to target devices configured for this purpose—the two receiving spaces 44a, 44b may be spatially positioned by moving the exchange device 40 in the X-direction, by moving the entire handling means 30 vertically in the Y-Direction or by rotating the carrier device 20 including the handling means 30 about the axis of rotation R. The three movement options form a cylindrical movement system that allows spatial positioning in all three spatial directions (within the possible range).

The handling device 100 is further configured to interact with the pallet storage 200 and the setup station 300 of the handling system 1000 such that the handling device 100 is configured to transfer workpiece pallets 101 from storage spaces 220 of the pallet storage 200 or from the setup station 300 to the handling means 30 or the exchange device 40 or transfer them from the handling means 30 or the exchange device 40 thereto.

The pallet storage 200 comprises a plurality of storage levels 210 arranged at different heights in a part-circle around the handling device 100, with a plurality of storage spaces 220 being configured to receive workpiece pallets 101 on each storage level 210, each of which is within the range of the cylindrical movement system of the handling device 100.

For reasons of representation, carrier devices of the individual storage levels 210 are not shown in FIG. 1.

The setup station 300 is also set up on the floor next to the handling device 100 and includes a pallet receptacle 310 which is configured to receive workpiece pallets 101 and is arranged on the upper side.

Setup work, e.g. clamping a workpiece, may preferably be carried out on the workpiece pallet 101 received at the setup station 300.

The shown handling system 1000 according to the invention enables a large number of workpiece pallets 101, 101a, 101b to be handled quickly and efficiently with the aid of the handling device 100, the advantageous embodiment of which significantly reduces the load on the handling device 100 by the usually very heavy workpiece pallets, particularly when two received workpiece pallets 101a and 101b are handled at the same time.

Figure 2:
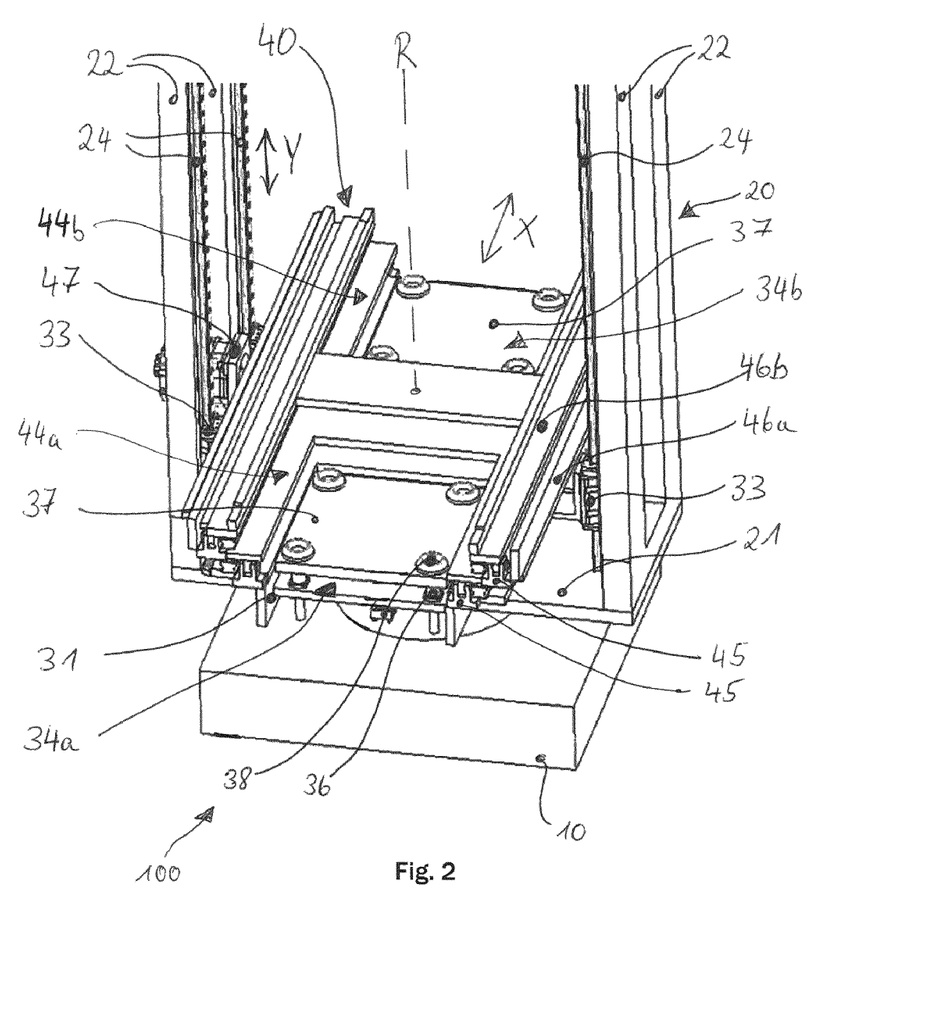
FIG. 2 shows a lower part of a handling device corresponding essentially to the handling device of the handling system from FIG. 1 in a state without workpiece pallets being loaded.

FIG. 2 shows a lower part of a handling device 100 essentially corresponding to the handling device of the handling system of FIG. 1 in a state in which the exchange device 40 is not loaded with workpiece pallets and not extended, i.e. in an initial state of the exchange device 40.

The initial state is characterized in that the decoupling of workpiece pallets handled by the handling means 30 can be performed with the aid of first and second decoupling devices 34a and 34b. The initial state is only limited to a specific position or initial position of the exchange device in the X-direction, whereas a positioning of the handling means 30 in the Y-direction or of the carrier device 20 about the axis of rotation R is not relevant to said initial state.

In addition to the description of the embodiment shown in FIG. 1, FIG. 2 shows linear carriages 33 which are connected to the carrier element 31, engage in the guide rails 24 on the side struts 22 of the carrier device and mount the handling means 30 such that it can be moved in the Y-direction.

In addition, FIG. 2 shows the base element 21 of the carrier device, which is covered in the illustration in FIG. 1, with the base 10 underneath.

In addition to the description of the embodiment shown in FIG. 1, the two decoupling devices 34a, 34b for the two receiving spaces 44a, 44b of the exchange device 40 and a detailed view of the telescopic mechanism of the exchange device 40 in the initial state are shown.

In the initial state of the exchange device 40, the decoupling devices 34a, 34b are each arranged below the receiving spaces 44a, 44b and each comprise a plurality of lifting elements 36 arranged on the carrier element 31 with drive devices, via which a lifting plate 37 can be moved in a vertical direction relative to the carrier element 31, namely upwards in a lifting movement and downwards in a lowering movement, in order to make contact with the workpiece pallet received in the respective receiving space 44a, 44b above and to lift it or to lower the workpiece pallet back into the receiving space 44a, 44b.

The lifting elements 36 of the decoupling devices 34a, 34b, which are configured as electric linear actuators, move the lifting plates 37 in the vertical direction and in this way decouple a workpiece pallet located above in the initial state of the exchange device 40 in such a way that subsequent movements of the exchange device 40 in the X-direction can no longer be transferred to the decoupled workpiece pallet.

Four symmetrically arranged receptacles 38 for cone-shaped positioning means, in which the corresponding counterparts (cones) are received on a lower side of the workpiece pallets in the course of a decoupling by the lifting movement, are arranged on upper sides of the lifting plates 37. As a result, a position and orientation of a decoupled workpiece pallet in the decoupled state with respect to the respective decoupling device 34a, 34b and thus also with respect to the carrier element 31 is clearly defined. In other words, due to the positioning means, there is only one possible arrangement (position and orientation) of the decoupled workpiece pallet on the lifting plate 37.

The exchange device 40 is driven by the drive 47 arranged laterally between the side struts 22 in order to bring about traversing movements or a extending or retracting telescopic movements of the exchange device 40. Here, the exchange device 40 can be moved from the initial state shown both away from the viewer and towards the viewer in X-direction (representation by double arrow in the X-direction).

The first telescopic carriage 46a is connected to the carrier element 31 via a telescopic rail 45 or a pair of telescopic rails 45 so that it can be moved in the X direction. A further (second) telescopic rail 45 or a second pair of telescopic rails 45, via which the second telescopic carriage 46b with the receiving spaces 44a, 44b can be moved in the X-direction relative to the first telescopic carriage 46a, is arranged on the first telescopic carriage 46a.

The telescopic carriages 46a, 46b are L-shaped in the cross section perpendicular to the X-direction in order to achieve high bending and torsional rigidity.

The second telescopic carriage 46b is also H-shaped when viewed along a vertical direction (Y-direction) with a central transverse strut and two longitudinal struts arranged thereon that extend in parallel to the second telescopic rail 45 so that engaging workpiece pallets to be received from below is not prevented by other transverse struts.

Furthermore, the second telescopic carriage 46b includes support portions which are arranged on the upper side on the longitudinal struts at the two receiving spaces 44a, 44b and on which a received workpiece pallet later rests in a coupled (not decoupled) state.

Figure 3A:
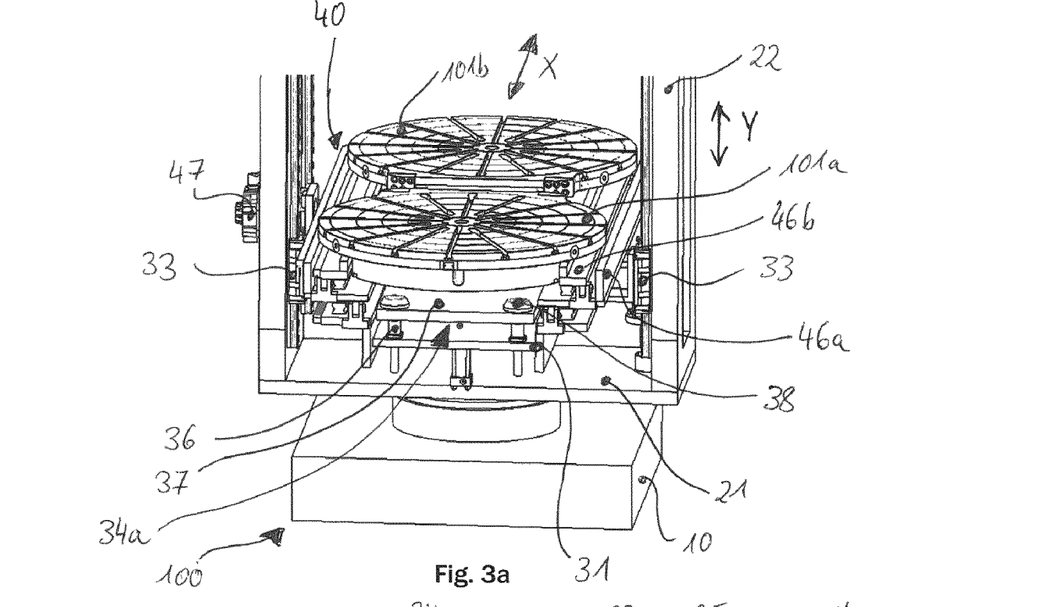
FIGS. 3a to 3c show the lower part of the handling device from FIG. 2 in a state with workpiece pallets being loaded.

FIG. 3a shows the lower part of the handling device 100 from FIG. 2 in a state where the exchange device 40 is loaded with the first and second workpiece pallets 101a and 101b and is not extended.

The first workpiece pallet 101a is received in the first receiving space 44a and the second workpiece pallet 101b is received in the second receiving space 44b of the exchange device 40.

The workpiece pallets 101a, 101b that have been received rest on both sides of the support portions of the second telescopic carriage 46b that are arranged on the upper side. The usually high weight of the received workpiece pallets 101a, 101b also causes high static friction between the workpiece pallets 101a, 101b and the second telescopic carriage 46b so that a relative movement of these on the second telescopic carriage 46b is prevented until an limit of adhesion is exceeded.

Figure 3B:
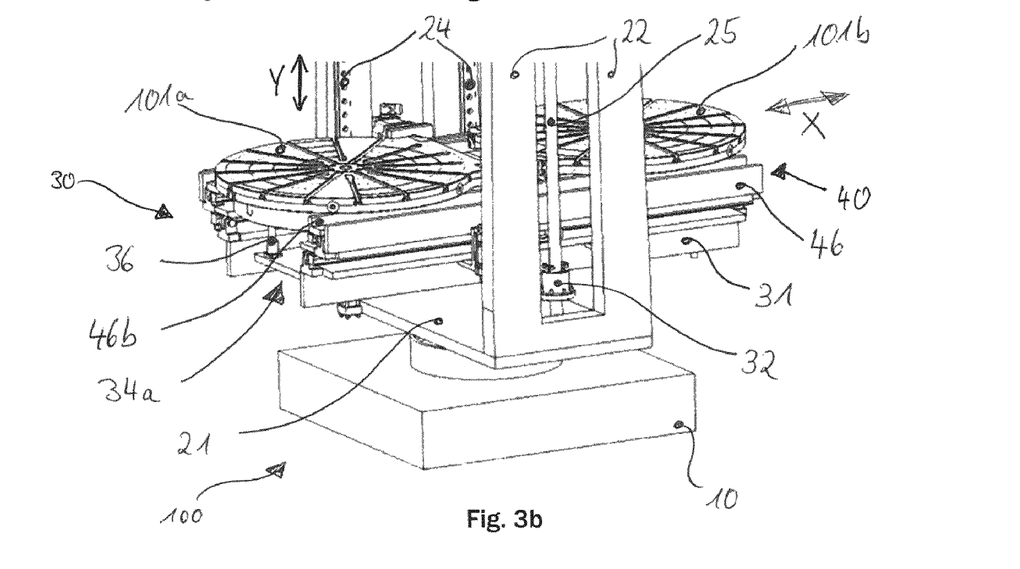

FIG. 3b shows the lower part of the handling device 100 from FIG. 3a with a partially lifted first decoupling device 34a in a different perspective from FIG. 3a.

In addition to the view from FIG. 3a, in the side perspective in FIG. 3b, the vertical spindle 25 for the traversing movements of the handling means 30 in the Y-direction is shown, with which the handling means 30 or the carrier element 31 is connected via a spindle nut 32 via which a rotation of the vertical spindle 25 is translated into a vertical translational movement of the handling means 30 in the Y-direction. The vertical spindle is self-locking.

Moreover, the first decoupling device 34a associated with the first receiving space 44a in the illustration shown has already moved up to the lower side of the first workpiece pallet 101a received in the first receiving space 44a without having completely decoupled it from the exchange device 40. The weight of the first workpiece pallet 101a therefore still rests at least partially on the exchange device 40.

Figure 3C:
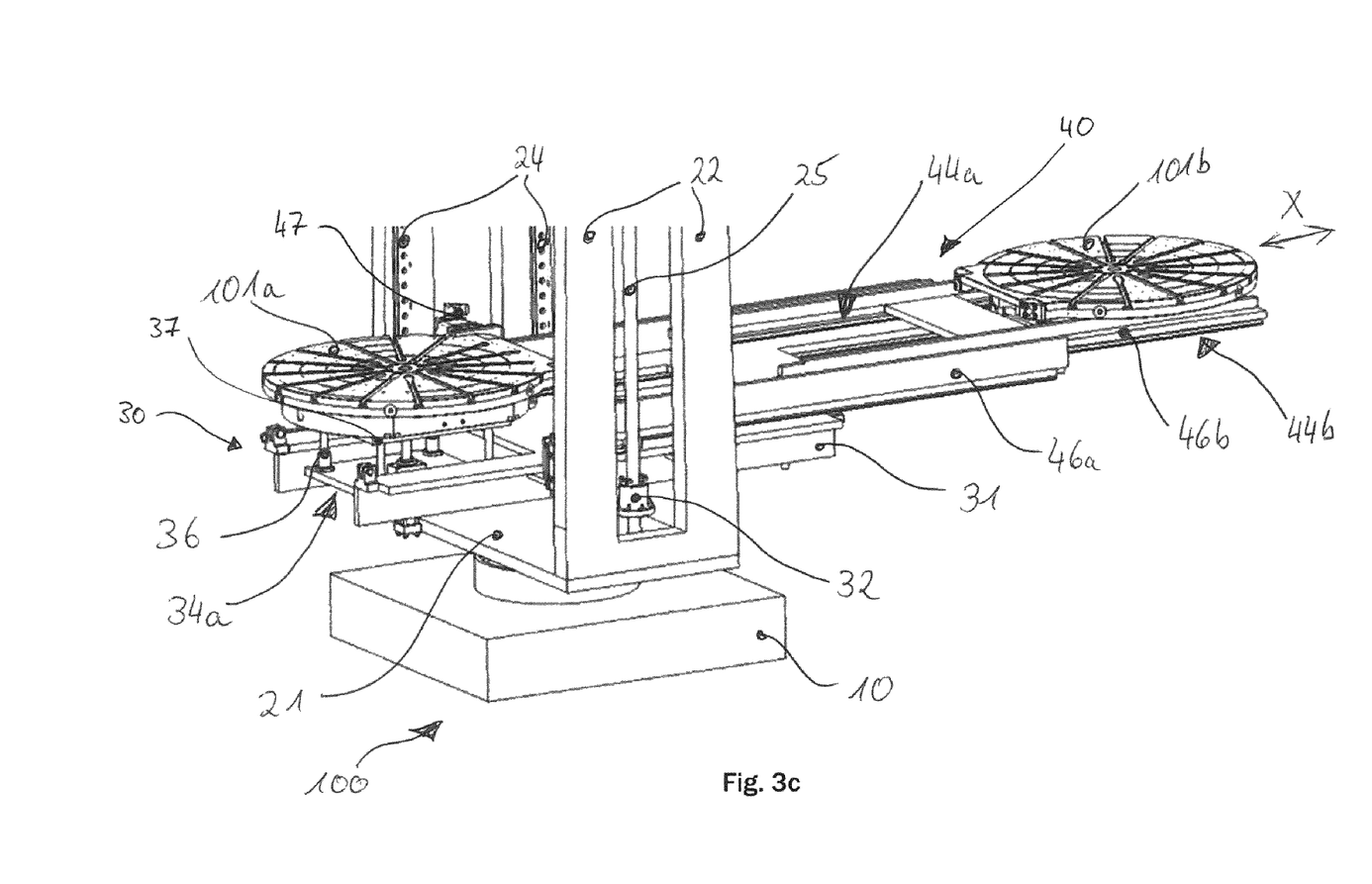

For this purpose, the lifting elements 43 have lifted the lifting plate 37 vertically in the direction of the lower side of the workpiece pallet 101a compared to the configuration shown in FIG. 3a. Continuing this movement would lead to a decoupling of said first workpiece pallet 101a, as a result of which the configuration of the handling device 100 shown in FIG. 3c can ultimately be achieved FIG. 3c shows the lower part of the handling device 100 from FIGS. 3a and 3b in an extended state of the exchange device 40 and with a decoupled first workpiece pallet 101a.

In the extended state shown, the exchange device 40 was extended by the drive 47 in such a way that the first telescopic carriage 46a was moved almost halfway relative to the carrier element 31 and the second telescopic carriage 46b was again moved almost halfway relative to the first telescopic carriage 46b.

In the state shown, the first workpiece pallet 101a has been completely decoupled from the exchange device 40 or decoupled so that it was not moved in the course of the traversing movement of the exchange device 40 in the X-direction, but essentially retained its position relative to the carrier device.

For decoupling, the lifting movement of the lifting elements 36 already indicated in FIG. 3b was continued so that the first workpiece pallet 101a was lifted off the support portions of the second telescopic carriage 46a. The weight of the decoupled first workpiece pallet 101a now rests completely on the lifting plate 37 and is transferred evenly to the carrier element 31 of the handling means 30 via the five lifting elements 36 of the first decoupling device 34a, thereby relieving the exchange device 40 itself.

The five lifting elements 36 are arranged symmetrically with respect to the lifting plate 37, with four lifting elements 36 each being located in the corners of the lifting plate 37 and one lifting element 36 being arranged in the center, thereby preventing both the lifting plate 37 and the lifting elements 36 themselves from being unevenly loaded, provided that the decoupled workpiece pallet 101a is placed centrally on the lifting plate 37 through the interaction of the positioning means and the associated receptacles 38.

Due to the decoupling of the first workpiece pallet 101a, in the course of the subsequent movement of the exchange device 40 in the X-direction, only the empty first receiving space 44a was moved together with the second receiving space 44b including the second workpiece pallet 101b received therein in order to achieve the extended state shown in FIG. 3c.

A tilting moment caused by the weight of the workpiece pallets 101a, 101b is consequently lower than in a case with the first workpiece pallet 101a received in the first receiving space 44a (that is, not previously decoupled).

This reduces a load on the mounting of the handling means 30, in particular on the guide rails 24 used for this purpose, as well as a load on the carrier device carrying the handling means 30, the base 10 arranged underneath and the load-bearing floor surface. This inevitably leads to lower load (lower material stress) and to lower component deformations, e.g. in the form of bending or torsion, which in turn increases the precision when handling the workpiece pallets 101a, 101b.

In particular, the mechanical stress on the telescopic mechanism 45, 46a, 46b of the exchange device 40, which is heavily subjected to bending in the extended state, is reduced.

In other words, the overall mechanical load on the handling device 100 can be significantly reduced by the configuration according to the invention, without having to forego the possibility of simultaneous and precise handling of a plurality of workpiece pallets 101a, 101b.

It should be noted that the exchange device 40 can also telescope the first workpiece pallet 101a, in which case the second workpiece pallet 101b can be decoupled by the corresponding second decoupling device 34b. The handling means is constructed symmetrically in such a way that the exchange device 40 can be extended on both sides in order to extend or telescope either the first workpiece pallet 101a or the second workpiece pallet 101b. The same applies, of course, to traverse movements back to the initial state.

As a result, the single exchange device 40 with the two receiving spaces 44a, 44b and a single drive 47 is configured to handle the two workpiece pallets 101a, 101b on both sides, which means that handling processes can be accelerated and be made more flexible without having to rely on further additional exchange devices.

Exemplary embodiments of the present invention and advantages thereof have been described in detail above with reference to the attached figures.

It is again pointed out that the present invention is in no way limited to the exemplary embodiments described above and implementation features thereof. The invention also includes modifications of the exemplary embodiments mentioned, in particular those resulting from modifications and/or combinations of one or more features of the exemplary embodiments described within the scope of the independent claims.

LIST OF REFERENCE SYMBOLS 10 base
20 frame-shaped carrier device
21 base element
22 side strut
23 head element
24 guide rail
25 vertical spindle
26 spindle drive
30 handling means
31 carrier element
32 spindle nut
33 linear carriage
34a decoupling device for the first receiving space
34b decoupling device for the second receiving space
36 lifting element
37 lifting plate
38 receptacle for cone-shaped positioning means
40 exchange device
44a first receiving space
44b second receiving space
45 telescopic rail
46a first telescopic carriage
46b second telescopic carriage
47 drive for exchange device
100 handling device
101 workpiece pallet
101a first workpiece pallet
101b second workpiece pallet
200 pallet storage
210 storage level
220 storage space for workpiece pallet
300 setup station
310 pallet receptacle at setup station
1000 handling system
X first direction of movement
Y vertical direction of movement
R axis of rotation

The invention claimed is:

1. A handling system (1000) comprising:
a handling device (100), including
   a carrier device (20), and
   a handling means (30), for handling workpiece pallets (101, 101a, 101b), that is carried by said carrier device (20) and that includes an exchange device (40) with at least two workpiece pallet receiving spaces (44a, 44b),
wherein
said handling means (30) is configured to move said exchange device (40) relative to said carrier device (20) along a first direction of movement (X) in such a way that both workpiece pallet receiving spaces (44a, 44b) are moved together, and
said handling means (30) includes at least one decoupling device (34a, 34b) that is configured to decouple a workpiece pallet (101a, 101b), which is being handled by said handling means (30) and is in one of the at least two workpiece pallet receiving spaces (44a, 44b), from said exchange device (40) in such a manner that the decoupled workpiece pallet (101a; 101b) is carried by the handling means (30) and is substantially maintained in its position relative to said carrier device (20) during a movement of said exchange device (40) relative to the decoupled workpiece pallet (101a, 101b) along the first direction of movement (X).

2. The handling system (1000) according to claim 1, characterized in that
said handling device (100) is configured to transfer the workpiece pallet (101a, 101b) received in one of the at least two receiving spaces (44a, 44b) to at least one target device (220, 310) configured to receive workpiece pallets (101) and/or receive the workpiece pallet (101) received by the at least one target device (220, 310) in one of the at least two receiving spaces (44a, 44b).

3. The handling system (1000) according to claim 2, characterized in that
the at least one target device is a receiving device arranged in a work space of a machine tool set up adjacent to said handling system (1000).

4. The handling system (1000) according to claim 1, characterized in that
the at least one decoupling device (34a, 34b) comprises a lifting device (36) configured to decouple the decoupled workpiece pallet (101a, 101b) by means of a vertically directed lifting movement.

5. The handling system (1000) according to claim 4, characterized in that
the at least one decoupling device (34a, 34b) comprises at least one receptacle for positioning means (38) which is configured, in the course of the lifting movement, to engage in a positioning means which is arranged on the lower side of the decoupled workpiece pallet (101a, 101b) such that a position and orientation of the decoupled workpiece pallet (101a; 101b) that has been decoupled by the lifting movement relative to the at least one decoupling device (34a, 34b) is clearly defined.

6. The handling system (1000) according to claim 1, characterized in that
said handling means (30) includes a plurality of decoupling devices (34a, 34b) of the receiving spaces (44a, 44b) of said exchange device (40) is associated with a respective one of the plurality of decoupling devices (34a, 34b).

7. The handling system (1000) according to claim 1, characterized in that
said exchange device (40) includes at least one telescopic rail (45) and at least one telescopic carriage (46b) that can be moved horizontally in the first direction of movement (X) relative to the at least one telescopic rail (45) and on which the at least two receiving spaces (44a, 44b) are arranged.

8. The handling system (1000) according to claim 1, characterized in that
said handling device (100) is configured to move said handling means (30) in a translatory manner relative to said carrier device (20) along a vertically oriented direction of movement (Y) by means of a translatory drive device (25).

9. The handling system (1000) according to claim 8, characterized in that
said carrier device (20) is configured to be frame-shaped with a base element (21), two side elements (22) and a head element (23), wherein the two side elements (22) each comprise at least two guide rails (24) by which said handling means (30) carried by said carrier device (20) is mounted such that it can be moved along the vertically oriented direction of movement (Y).

10. The handling system (1000) according to claim 8, characterized in that said handling device (100) further comprises a base device (10) carrying said carrier device (20), wherein said handling device (100) is configured to turn said carrier device (20) relative to said base device (10) via a rotary drive device about a vertically oriented axis of rotation (R).

11. The handling system (1000) according to claim 10, characterized in that said handling device (100) is configured to position one of the at least two receiving spaces (44a, 44b) by movements of said handling means (30) along the vertically oriented direction of movement (Y) and/or by turning movements about the vertically oriented axis of rotation (R) and/or by moving said exchange device (40) along the first direction of movement (X) in such a way relative to the at least one target device (220, 310) that the workpiece pallet (101) received by the target device (220, 310) can be received by said exchange device (40) in the positioned receiving space (44a; 44b) and/or the workpiece pallet (101a; 101b) received in the positioned receiving space (41a; 41b) can be transferred to the target device (220, 310).

12. The handling system (1000) according to claim 1, characterized in that said handling system (1000) comprises a pallet storage (200) including a plurality of storage spaces (220) which are configured to receive workpiece pallets (101) and are each target devices (220) for said handling device (100).

13. A handling device (100) for use in a handling system (1000), the handling device comprising:

a carrier device (20), and a handling means (30), for handling workpiece pallets (101, 101a, 101b), that is carried by said carrier device (20) and that includes an exchange device (40) with at least two workpiece pallet receiving spaces (44a, 44b), wherein said handling means (30) is configured to move said exchange device (40) relative to said carrier device (20) along a first direction of movement (X) in such a way that both workpiece pallet receiving spaces (44a, 44b) are moved together, and said handling means (30) includes at least one decoupling device (34a, 34b) that is configured to decouple a workpiece pallet (101a, 101b), which is being handled by said handling means (30) and is in one of the at least two workpiece pallet receiving spaces (44a, 44b), from said exchange device (40) in such a manner that the decoupled workpiece pallet (101a; 101b) is carried by the handling means (30) and is substantially maintained in its position relative to said carrier device (20) during a movement of said exchange device (40) relative to the decoupled workpiece pallet (101a, 101b) along the first direction of movement (X).

14. A machine tool comprising a work space having at least one receiving device for receiving workpiece pallets (101) arranged therein;

a handling system (1000) according to claim 2 arranged adjacent to the work space;

wherein the at least one receiving device arranged in the work space is a target device of said handling system (1000).

\* \* \* \* \*